United States Patent [19]
Sazhin et al.

[11] Patent Number: 5,846,675
[45] Date of Patent: Dec. 8, 1998

[54] CURRENT COLLECTOR FOR LITHIUM ION BATTERIES

[75] Inventors: Sergey V. Sazhin; Mikhail Yu Khimchenko, both of Suwon; Yevgeniy N. Tritenichenko, Suwon; Whan-jin Roh, Seoul; Hong-yoel Kang, Daejun, all of Rep. of Korea

[73] Assignee: Samsung Display Devices Co., Ltd., Rep. of Korea

[21] Appl. No.: 804,728

[22] Filed: Feb. 21, 1997

[51] Int. Cl.$^6$ .................................................. H01M 4/66
[52] U.S. Cl. .................. 429/245; 29/2; 205/64; 427/123; 427/383.7; 427/409
[58] Field of Search ................... 427/123, 383.1, 427/383.7, 409; 29/2; 429/245; 205/64; 428/650, 658

[56] References Cited

U.S. PATENT DOCUMENTS

| | | |
|---|---|---|
| 606,526 | 6/1898 | Epstein . |
| 746,227 | 12/1903 | Yai . |
| 976,092 | 11/1910 | Morrison . |
| 1,134,093 | 4/1915 | Bauer . |
| 1,137,226 | 4/1915 | Manchester . |
| 1,289,366 | 12/1918 | Benner et al. . |
| 1,496,526 | 6/1924 | Cox . |
| 1,496,528 | 6/1924 | Cox . |
| 1,765,137 | 6/1930 | Dunham . |
| 3,615,830 | 10/1971 | Johnson ........................................ 136/6 |
| 3,726,705 | 4/1973 | Carter et al. ........................... 427/383.7 |
| 3,884,716 | 5/1975 | Walker ................................. 429/245 X |
| 4,001,467 | 1/1977 | Sullivan .................................... 427/123 |
| 4,163,829 | 8/1979 | Kronenberg .............................. 429/194 |
| 4,167,609 | 9/1979 | Scarr ......................................... 429/206 |
| 4,604,335 | 8/1986 | Johnson .................................... 429/197 |
| 5,132,177 | 7/1992 | Kawano et al. .......................... 429/206 |
| 5,356,723 | 10/1994 | Kimoto et al. ........................... 428/650 |
| 5,470,357 | 11/1995 | Schmutz et al. ........................ 29/623.5 |
| 5,588,971 | 12/1996 | Fauteux et al. ...................... 429/245 X |

*Primary Examiner*—Stephen Kalafut
*Attorney, Agent, or Firm*—Christie, Parker & Hale, LLP

[57] ABSTRACT

An improved current collector for use with lithium ion batteries includes an aluminum grid of the type used for making conventional current collectors that is plated with a layer of zinc, the outermost portion of which is oxidized to zinc oxide. The current collector is made by first cleaning an aluminum grid in an aqueous basic solution to remove its outer layer of alumina. The cleaned aluminum grid is then plated with zinc by contact with an aqueous solution of zinc oxide. The plated aluminum grid is rinsed and dried in air to oxidize the outer surface of the zinc and form an outer layer of zinc oxide. The resulting zinc-plated current collector can be made into a battery with a higher conductivity at the interface between the current collector and the electrode active materials than a battery made with a conventional aluminum current collector. It also has a rough outer surface which improves its adhesion to the polymeric layers used in constructing a plastic lithium ion battery.

24 Claims, 4 Drawing Sheets

CURRENT COLLECTOR FOR LITHIUM ION BATTERIES

FIELD OF THE INVENTION

This invention relates to an improved current collector for use with lithium ion batteries and a method for making such a current collector. More particularly, it relates to an aluminum current collector plated with zinc and the method for making such a zinc-plated aluminum current collector.

BACKGROUND OF THE INVENTION

Lithium ion batteries are useful because they have a high energy density and can be discharged and recharged over several thousand cycles. Plastic lithium ion batteries are generally made by the lamination of electrodes and electrolyte-containing polymeric cell elements to one another. An aluminum grid is often used as the positive current collector for such a lithium ion battery. A method for making a lithium ion battery is set forth in U.S. Pat. No. 5,470,357, which is hereby incorporated by reference. As taught by U.S. Pat. No. 5,470,357, by improving the adhesion between the layers that form a lithium ion battery, battery reliability can be improved. However, still further improvements in lithium ion battery performance are desired.

SUMMARY OF THE INVENTION

Aluminum current collectors of the type used with lithium ion batteries generally include an outer layer of nonconductive alumina. This layer of alumina helps to protect the current collector from dissolution. However, due to its relatively high resistivity, the presence of this layer of alumina also has an adverse impact on battery performance.

According to the present invention, a typical aluminum grid such as those used for making conventional current collectors is first cleaned to remove the surface layer of nonconductive alumina. The details of such grids are well known in the art. Preferred grids include expanded metal grids and perforated foil grids. The cleansing of the aluminum grid is performed by contacting it with a cleaning solution, preferably an aqueous basic solution containing about 40 to 50 grams per liter of sodium hydroxide. The cleaning step can generally be performed by immersing the aluminum grid in the cleaning solution for between about 20 and about 40 seconds.

After cleaning the aluminum grid, it is then plated with zinc by contacting it with a plating solution. Preferably, the plating solution is an aqueous plating solution containing zinc oxide. The zinc oxide is maintained in solution by the addition of a base such as sodium hydroxide to the solution. A preferred plating solution contains between about 50 and about 100 grams per liter of zinc oxide and about 400 to about 500 grams per liter of sodium hydroxide. The aluminum grid is plated by immersing it in such a solution for between about 2 and about 20 seconds.

After plating the aluminum grid with zinc, it is then rinsed in water and dried in warm air. In addition to drying the zinc-plated aluminum grid, this step forms a layer of zinc oxide over the outer plated surface of the grid. The zinc oxide is useful as a protective layer and provides benefits similar to the layer of alumina present on conventional aluminum current collectors. However, the zinc oxide is substantially more conductive than alumina, on the order of $10^{14}$ times more conductive. Therefore, batteries employing a current collector of the present invention have improved performance over conventional batteries.

The formation of an improved current collector by plating an aluminum grid's surface with a first layer of zinc that is oxidized on its outer surface to form a second layer of zinc oxide is also beneficial in that the zinc and zinc oxide layers help to roughen the outer surface of the current collector. By roughening its outer surface, the adherence between the current collector and the polymeric layers used in forming the battery is greatly improved. This still further improves battery performance.

One specific improvement in performance is that batteries made with the zinc-plated current collectors of the present invention have better charge-discharge characteristics than conventional batteries. In particular, these batteries have higher discharge capacity and lower impedance than batteries with conventional aluminum current collectors. Furthermore, batteries using the improved current collector have significantly lower capacity fade and better cycle life than batteries with conventional aluminum current collectors. The net result is a battery that is more economical and reliable than prior art lithium ion batteries.

BRIEF DESCRIPTION OF THE DRAWINGS

The present invention will be described with reference to the accompanying drawings, in which.

DETAILED DESCRIPTION OF THE INVENTION

Figure 1:
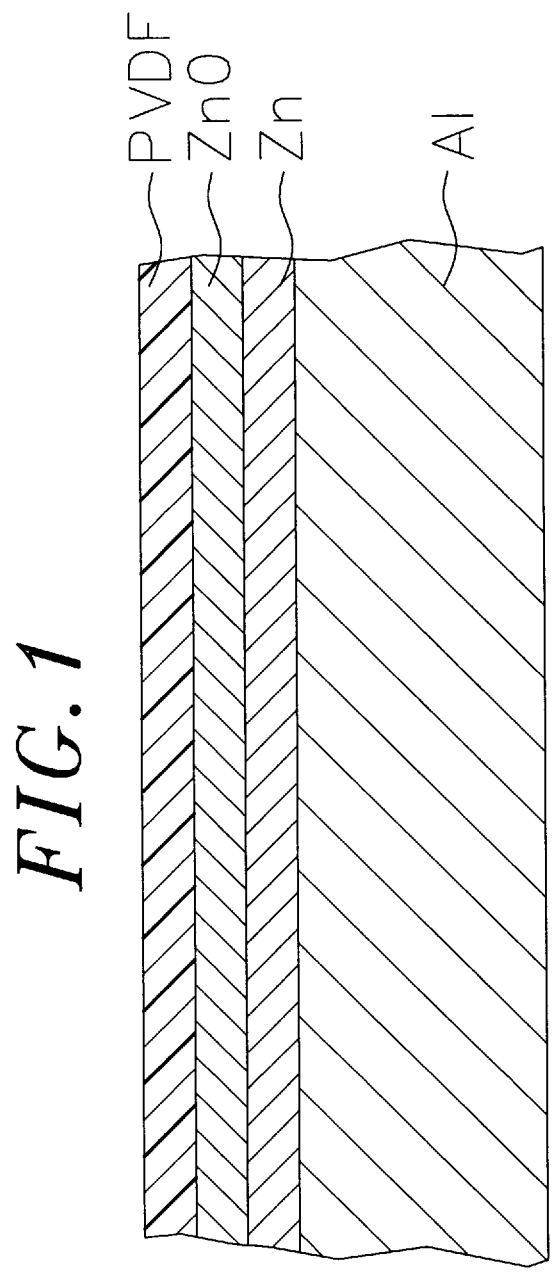
FIG. 1 is a sectional view of a zinc-plated current collector of the present invention.

According to the present invention, an improved current collector is made by plating a conventional aluminum grid such as those used for making conventional current collectors with zinc. The aluminum grid can be of several forms. Preferred grids are made of perforated foil or expanded metal of the types made by Exmet Corporation of Naugatuck, Conn. or Thank Co., Ltd of Japan.

As a first step, the aluminum grid is cleaned in order to remove any alumina that may be present on its outer surface. This is best performed by contacting the aluminum grid with a cleaning solution. Preferably the cleaning solution is an aqueous basic solution. Solutions containing sodium hydroxide, potassium hydroxide, lithium hydroxide, cesium hydroxide, ammonium hydroxide or mixtures thereof are useful as cleaning solutions. However, for economic reasons, cleaning solutions containing sodium hydroxide are presently preferred.

In the preferred embodiment, an aqueous cleaning solution is prepared with 40 to 50 grams per liter of sodium hydroxide. The aluminum grid is immersed in this cleaning solution for a short period of time, preferably between about 20 and about 40 seconds. During a cleaning step in which a sodium hydroxide cleaning solution is used, the thin layer of alumina is partially dissolved according to the reaction:

$$Al_2O_3 + 2\ NaOH \rightarrow 2\ NaAlO_2 + H_2O$$

The removal of the alumina is also promoted by alumina peeling caused by the evolution of hydrogen gas according to the following reaction occurring between the aluminum grid and the basic cleaning solution:

$$2\ Al + 2\ H_2O + 2\ NaOH \rightarrow 2\ NaAlO_2 + 3\ H_2\uparrow$$

Once the aluminum grid has been cleaned to remove the layer of nonconductive alumina, it is then plated with zinc. This plating process is performed by contacting the aluminum grid with a plating solution, preferably an aqueous solution of zinc oxide. In order to improve the solubility of zinc oxide in the plating solution, a basic solution is used. Preferred basic solutions to which the zinc oxide is added comprise aqueous solutions of sodium hydroxide, potassium hydroxide, lithium hydroxide, cesium hydroxide, ammonium hydroxide or mixtures thereof. As with the cleaning solution, an aqueous solution of sodium hydroxide is preferred for economic reasons. In the most preferred embodiment, the plating solution comprises about 400 to about 500 grams per liter of sodium hydroxide and about 50 to about 100 grams per liter of zinc oxide.

The plating step proceeds very quickly and is completed by immersing the aluminum grid in such a plating solution for between about 2 and about 20 seconds. During this step, the zinc plating occurs according to the reaction:

$$2\ Al + 3\ Zn^{2+} \rightarrow 2\ Al^{3+} + 3\ Zn$$

This plating step results in the deposition of a layer of zinc a few microns thick on the outer surface of the aluminum grid.

After the aluminum grid has been plated with zinc, it is washed and dried in warm air. By drying the zinc-plated aluminum grid in air, the outermost surface of the zinc-plated surface is oxidized to form a protective layer of zinc oxide. This outer layer of zinc oxide is beneficial in protecting the current collector from dissolution, similar to the layer of alumina present on conventional aluminum current collectors. However, the inclusion of a zinc oxide layer on the resulting current collector represents a significant improvement over a conventional aluminum current collector in that the zinc oxide is far more conductive than alumina.

A further benefit of the plated current collector of the present invention is that the zinc-plated current collector tends to have a rough outer surface. This roughening of the outer surface substantially improves the adherence of the polymeric layer to the current collector. By improving the adherence of the polymeric layer, the electrode's active mass is improved as is the overall reliability of the battery.

The layered construction of a current collector of the present invention is illustrated in FIG. 1 which is a cross-sectional view of a portion of a current collector for a lithium ion battery. The current collector includes a base substrate of aluminum (Al) upon which is plated a layer of zinc (Zn) which is partially oxidized to form an outer layer of zinc oxide (ZnO). A layer of polymeric material, in this case, polyvinylidene fluoride (PVDF) is then adhered to the zinc oxide layer of the current collector.

The invention will be further described with reference to the following examples, which are illustrative but not intended to be limiting.

EXAMPLE 1

Two 30 mm by 80 mm aluminum grids, each in the form of an expanded metal grid (Thank Co., Ltd, Japan) having a thickness of about 80 microns were trimmed at one end to form a tab to serve as a battery terminal. The surface of the first aluminum grid was first cleaned with acetone (Aldrich Chemical Company, U.S.A.). Then, to remove the outer layer of alumina present on the first aluminum grid, it was immersed in an aqueous cleaning solution containing 40 grams per liter of sodium hydroxide (Aldrich Chemical Company) for about 40 seconds.

The cleaned aluminum grid was then removed from the cleaning solution and immediately immersed in a plating solution containing 100 grams per liter of zinc oxide (Aldrich Chemical Company) and 500 grams per liter of sodium hydroxide. The aluminum grid was immersed in the plating solution for about eight seconds to form a thin layer of zinc over its outer surface.

After removing the plated aluminum grid from the plating solution, it was washed three times in distilled water and dried in a stream of warm air to form a zinc-plated aluminum current collector of the present invention. This drying step caused the oxidation of the outermost surface of the zinc-plated aluminum grid to produce a layer of zinc oxide.

The current collector was then primed with a 0.5% solution of PVDF (Kynar 2801, Elf Atochem North America, Inc.) in acetone as set forth in U.S. Pat. No. 5,470,357.

Like the first aluminum grid, the second aluminum grid was first cleaned in acetone. Then, this second aluminum grid was primed with PVDF without first plating it with zinc to form a conventional aluminum current collector.

EXAMPLE 2

Two lithium ion plastic batteries with identical surface areas and identical electrode weights were assembled according to identical assembling procedures.

A cathode slurry was prepared comprising 65 wt. % of $LiMn_2O_4$ (CHEMETALS, Inc., U.S.A.), 20 wt. % of dibutyl phthalate (DBP, Aldrich Chemical Company), 10 wt. % PVDF (Kynar 2801) and 5 wt. % of Super P Carbon Black (M.M.M. Carbon, Belgium).

An anode slurry was also prepared comprising 65 wt. % graphite mesocarbon microbead (MCMB 2528, Osaka Gas, Japan), 20 wt. % DBP, 10 wt. % PVDF (Kynar 2801) and 5 wt. % Super P Carbon Black.

A separator slurry was prepared comprising 40 wt. % PVDF (Kynar 2801), 40 wt. % DBP and 20 wt. % fumed silica (CAB-O-SIL TS-530, Cabot Co., U.S.A.). For each of the three slurries, acetone (Aldrich Chemical Co.) was used as the solvent.

Thin films of cathode, anode and separator were then made by casting the above slurries into films on a glass surface by techniques known in the art. The thicknesses of these dried films were 100 microns, 100 microns and 80 microns respectively.

The weight of the positive electrode mass for each of the two batteries was 2.32 grams. The weight of the negative electrode mass for each of the two batteries was 0.88 grams. The anode was made by laminating two sheets of anode film on either side of a grid of expanded copper (Thank Co., LTD., Japan) at 130° C. As with the aluminum grid, a perforated copper foil grid could have been used as the copper grid instead of an expanded metal grid.

In the same manner as set forth in Example 1, two cathodes were prepared: a first zinc-plated aluminum current collector of the present invention and a second non-plated conventional aluminum current collector.

Two unit cells were made by laminating two cathodes, one anode and two sheets of separator in a sandwich construction according to the following configuration: cathode/ separator/anode/separator/cathode. The first unit cell used the zinc-plated current collector and the second unit cell used the non-plated conventional current collector. The laminated cells were immersed in diethyl ether (Aldrich Chemical Co.) to extract the DBP plasticizer. The cells were then activated by immersion in a 1.0M electrolyte solution of $LiPF_6$ in EC/DMC in a 2:1 ratio (Mitsubishi Chemical Co., Japan) and sealed in a polyethylene/aluminum foil sealant envelope.

The solid electrolyte interface layer on the surface of each of the carbon anodes was made homogeneous by charging the cells at a low current of 0.42 $mA/cm^2$ to a voltage of 4.5 V and discharging at the same current down to 3.0 V.

Figure 2:
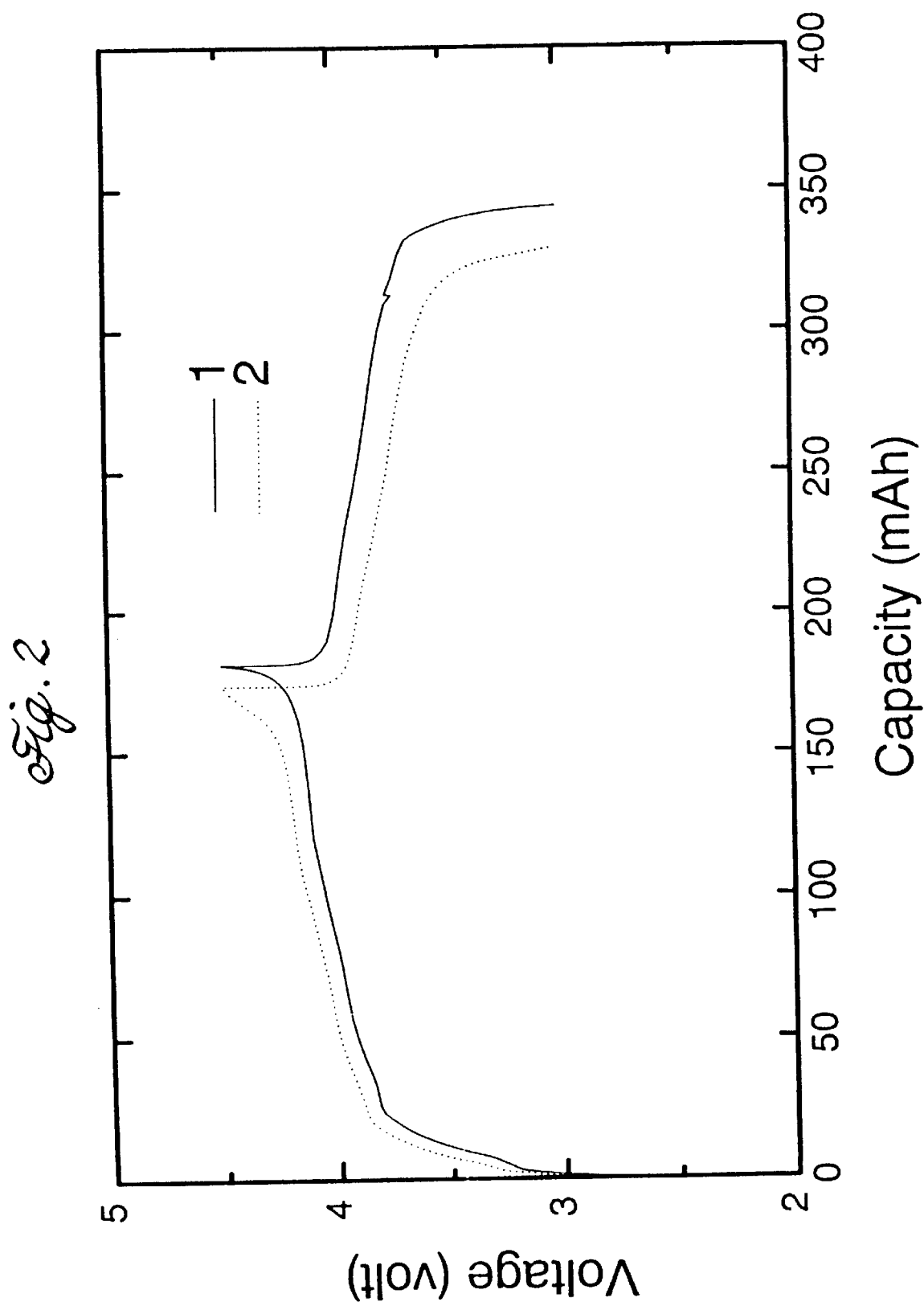
FIG. 2 illustrates the charge-discharge curves for a battery using a zinc-plated current collector according to the present invention compared to a battery using a conventional aluminum current collector.

The charge-discharge curves for these two batteries are illustrated in FIG. 2. For FIGS. 2–4, reference numeral 1 represents the test data for a battery using a zinc-plated current collector of the present invention and reference numeral 2 represents the test data for a battery using a conventional aluminum current collector. From FIG. 2 it is seen that the impedance of the battery using the zinc-plated current collector is much lower than that for the conventional battery in that its charge voltage is lower and its discharge voltage is higher than the corresponding charge voltage and discharge voltage for the battery with the conventional aluminum current collector. Specifically, the voltage for the battery using a zinc-plated current collector is between about 110 and 115 mV lower than for the battery using a conventional current collector during the charge procedure, and about 115 to 184 mV higher during the discharge procedure.

Figure 3:
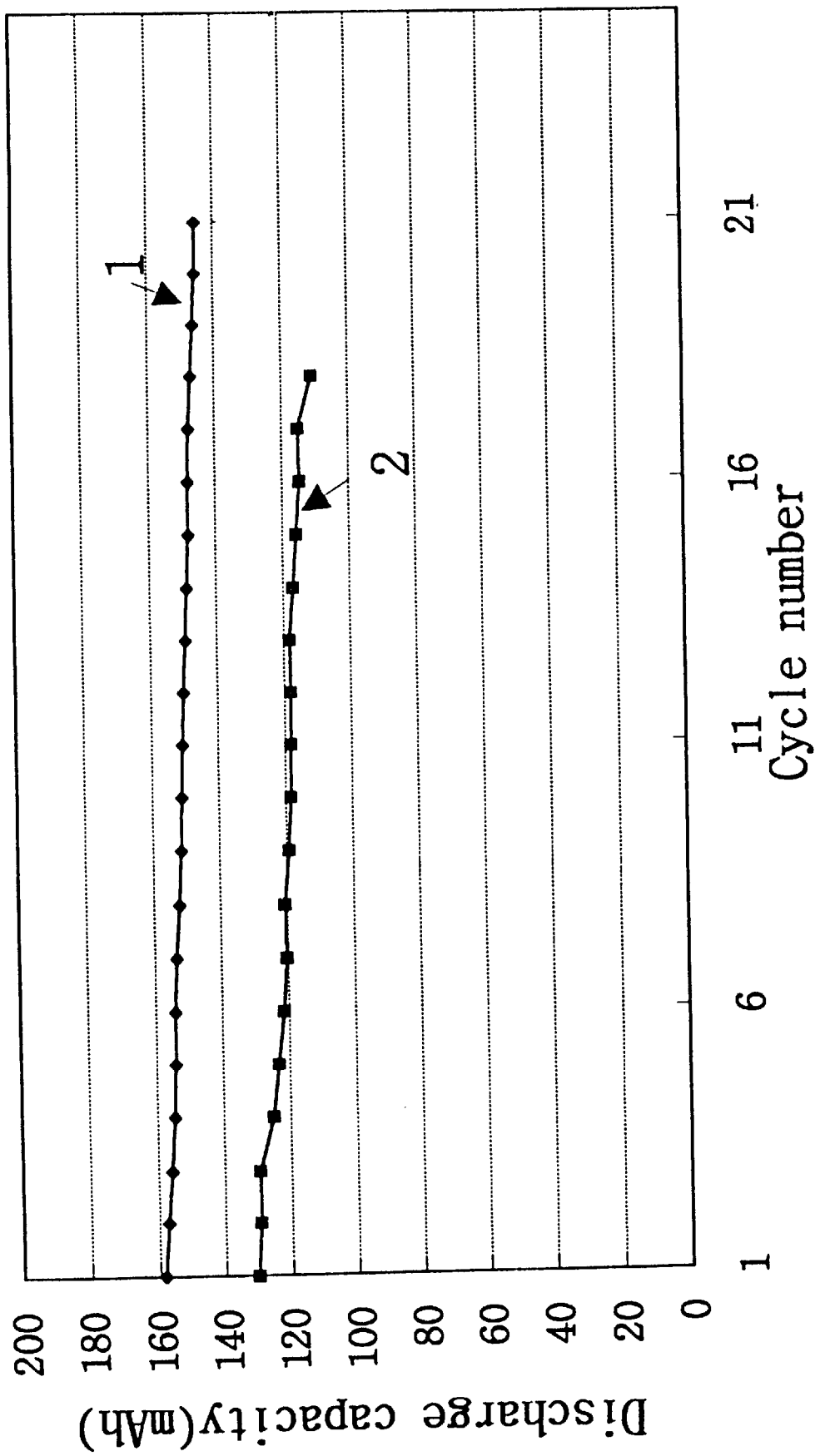
FIG. 3 illustrates the discharge capacity as a function of the number of charge-discharge cycles for a battery using a zinc-plated current collector according to the present invention compared to a battery using a conventional aluminum current collector.

The battery cells were then charged and discharged repeatedly at 1.46 $mA/cm^2$ between 3.0 and 4.5 V. Plots of the discharge capacity against the number of charge-discharge cycles for these two batteries are presented in FIG. 3. According to FIG. 3, the capacity of the battery using the zinc-plated current collector on the first discharge is 21.6% higher than that of a conventional battery. FIG. 3 also illustrates that the battery using the zinc-plated current collector retains its higher capacity over the entire range of charge-discharge cycles tested.

EXAMPLE 3

Two lithium ion plastic batteries were prepared according to Example 2. The weight of the positive electrode mass in the battery using the zinc-plated current collector was 2.36 grams and that for the battery with a conventional aluminum current collector was 2.24 grams. The weight of the negative electrode mass in the battery using a zinc-plated current collector was 0.88 grams and that for the battery with a conventional aluminum current collector was 0.84 grams. These batteries were continuously cycled. Charging was done under constant current of 1.25 $mA/cm^2$ to a voltage limit of 4.3 volts and constant voltage to a current limit of 0.31 $mA/cm^2$. Discharge was done under a constant current of 1.25 $mA/cm^2$ to a voltage limit of 2.5 volts. The cycling results for this test are shown in FIG. 4.

Figure 4:
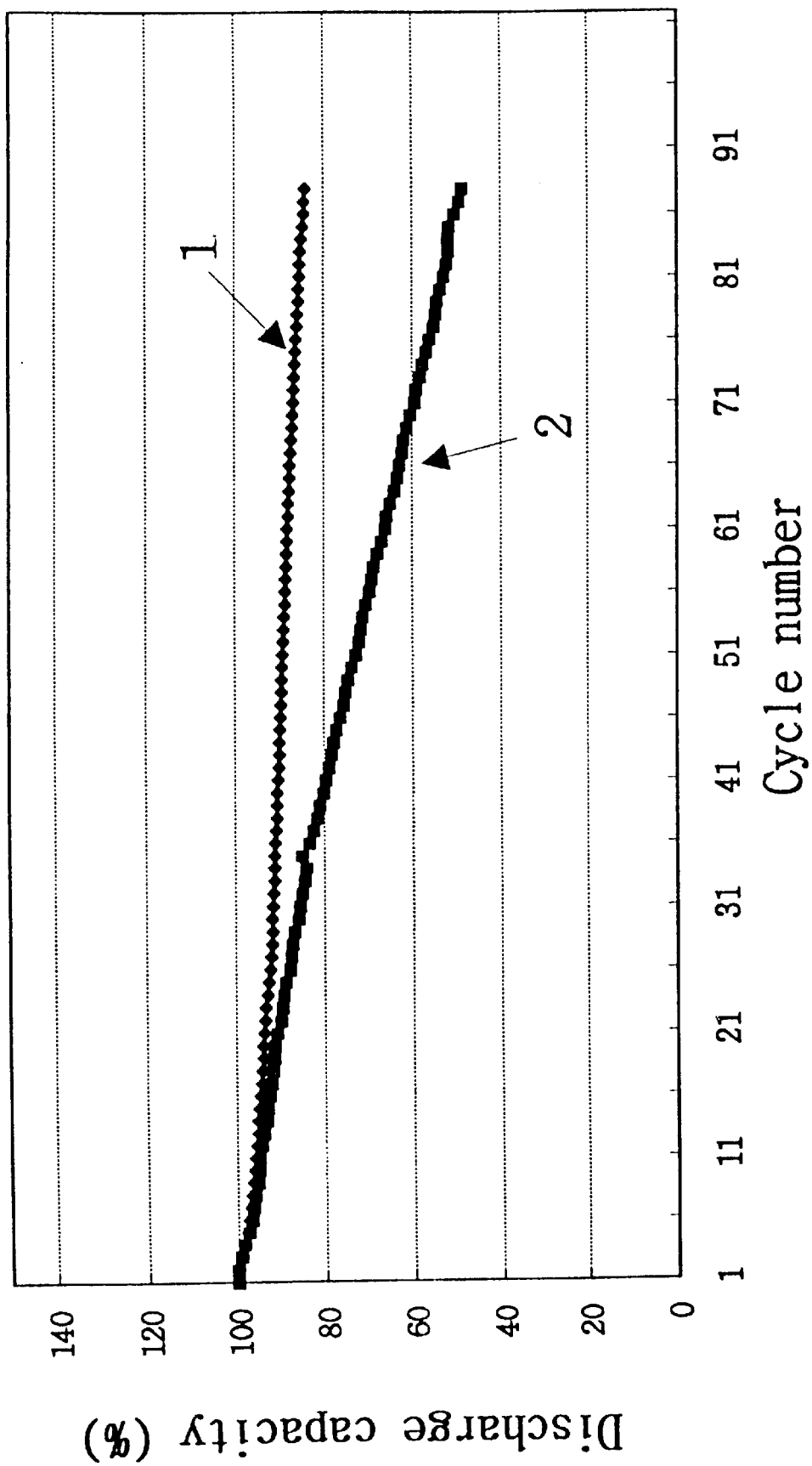
FIG. 4 illustrates the discharge fade curves for a battery using a zinc-plated current collector according to the present invention compared to a battery using a conventional aluminum current collector.

According to FIG. 4, the capacity fade for the battery using the zinc-plated current collector is much lower than that for the battery using a conventional aluminum current collector. Specifically according to FIG. 4, the capacity utilization of the battery using a conventional aluminum current collector at 88 cycles was 48.6%. The capacity utilization for the battery using a zinc-plated current collector at 88 cycles was 84.3%. By using a zinc-plated current collector according to the present invention, a 173% improvement in capacity utilization at 88 cycles is realized. FIG. 4 also shows that the battery using a conventional aluminum current collector decreases to 85% of initial capacity after only 31 cycles, while the capacity of the battery using the zinc-plated current collector does not decrease to 85% until after 84 cycles. This represents a 271% improvement in cycle life for the battery using the zinc-plated current collector over the battery with a conventional aluminum current collector.

In short, batteries using a zinc-plated current collector according to the present invention not only have higher capacity than batteries with conventional current collectors, they retain that higher capacity for a larger number of cycles than batteries with conventional current collectors. The net result is that a battery using a zinc-plated current collector of the present invention is both more reliable and more effective than a battery with a conventional aluminum current collector.

What is claimed is:

1. A method for making a current collector for use in a lithium ion battery comprising the steps of:

providing an aluminum grid;

cleaning the aluminum grid to remove an alumina layer present on the surface of the grid; and plating the cleaned aluminum grid with zinc.

2. The method of claim 1 wherein the plating step comprises the step of placing the cleaned aluminum grid in contact with an aqueous solution of zinc oxide.

3. The method of claim 2 wherein the aqueous solution of zinc oxide is a basic solution comprising about 50 to about 100 grams per liter of zinc oxide.

4. The method of claim 3 wherein the base is selected from the group consisting of sodium hydroxide, potassium hydroxide, lithium hydroxide, cesium hydroxide, ammonium hydroxide and mixtures thereof.

5. The method of claim 4 wherein the basic solution of zinc oxide comprises about 400 to about 500 grams per liter of sodium hydroxide.

6. The method of claim 2 wherein the plating step is performed by placing the cleaned aluminum grid in contact with the aqueous solution of zinc oxide for a period of time between about 2 and about 20 seconds.

7. The method of claim 1 wherein the cleaning step comprises the step of placing the aluminum grid in contact with a basic solution wherein the base is selected from the group consisting of sodium hydroxide, potassium hydroxide, lithium hydroxide, cesium hydroxide, ammonium hydroxide and mixtures thereof.

8. The method of claim 7 wherein the basic solution comprises about 40 to about 50 grams per liter of sodium hydroxide.

9. The method of claim 8 wherein the cleaning step is performed by placing the aluminum grid in contact with the basic solution of sodium hydroxide for a period of time between about 20 and about 40 seconds.

10. The method of claim 1 further comprising the step of oxidizing an outer layer of the zinc.

11. The method of claim 10 further comprising the step of adhering a layer of polymer to the plated aluminum grid.

12. A method for making a current collector for use with a lithium ion battery comprising the steps of:

providing an aluminum grid;

cleaning the aluminum grid by placing it in contact with a basic cleaning solution; and plating the cleaned aluminum grid with zinc by placing it in contact with an aqueous plating solution of zinc oxide.

13. The method of claim 12 further comprising the step of drying the plated aluminum grid in air to oxidize an outer layer of the zinc.

14. The method of claim 12 wherein the plating solution is a basic plating solution comprising about 50 to about 100 grams per liter of zinc oxide and a base.

15. The method of claim 14 wherein the base for the basic plating solution is selected from the group consisting of sodium hydroxide, potassium hydroxide, lithium hydroxide, cesium hydroxide, ammonium hydroxide and mixtures thereof.

16. The method of claim 15 wherein the plating solution comprises about 400 to about 500 grams per liter of sodium hydroxide.

17. The method of claim 12 wherein the plating step is performed by placing the cleaned aluminum grid in contact with the plating solution for between about 2 and about 20 seconds.

18. The method of claim 12 wherein the base for the basic cleaning solution is selected from the group consisting of sodium hydroxide, potassium hydroxide, lithium hydroxide, cesium hydroxide, ammonium hydroxide and mixtures thereof.

19. The method of claim 18 wherein the cleaning solution comprises about 40 to about 50 grams per liter of sodium hydroxide.

20. The method of claim 19 wherein the cleaning step is performed by placing the aluminum grid in contact with the aqueous solution of sodium hydroxide for between about 20 and about 40 seconds.

21. The method of claim 12 wherein the cleaning step is performed during a first time period of between about 20 and about 40 seconds in a cleaning solution comprising about 40 to about 50 grams per liter of sodium hydroxide and the plating step is performed during a second time period of between about 2 and about 20 seconds in a plating solution comprising about 50 to about 100 grams per liter of zinc oxide and about 400 to about 500 grams per liter of sodium hydroxide.

22. The method of claim 12 further comprising the step of oxidizing an outer surface of the plated aluminum grid.

23. The method of claim 22 further comprising the step of adhering a polymeric layer to the plated aluminum grid.

24. A battery comprising:

an anode;

a cathode comprising an aluminum grid with a first layer of zinc and a second layer of zinc oxide over the zinc; and an electrolyte.

* * * * *